(12) United States Patent
Nagarajan et al.

(10) Patent No.: US 8,009,940 B2
(45) Date of Patent: Aug. 30, 2011

(54) PHOTONIC INTEGRATED CIRCUIT WITH IMPROVED SIGNAL QUALITY AND ELECTROSTATIC DISCHARGE THRESHOLD

(75) Inventors: Radhakrishnan L. Nagarajan, Cupertino, CA (US); Masaki Kato, Palo Alto, CA (US)

(73) Assignee: Infinera Corporation, Sunnyvale, CA (US)

( * ) Notice: Subject to any disclaimer, the term of this patent is extended or adjusted under 35 U.S.C. 154(b) by 334 days.

(21) Appl. No.: 12/413,825

(22) Filed: Mar. 30, 2009

(65) Prior Publication Data

US 2010/0247028 A1    Sep. 30, 2010

(51) Int. Cl.
*G02B 6/12*    (2006.01)

(52) U.S. Cl. .................. 385/14; 385/1; 385/2; 385/3

(58) Field of Classification Search ................. 385/1, 2, 385/3, 14
See application file for complete search history.

(56) References Cited

U.S. PATENT DOCUMENTS

| 6,891,149 | B1 * | 5/2005 | Lewis et al. | 250/227.14 |
| 7,471,710 | B2 * | 12/2008 | Cliche et al. | 372/38.08 |

* cited by examiner

*Primary Examiner* — Jennifer Doan
(74) *Attorney, Agent, or Firm* — Ross Carothers; David L. Soltz (57) ABSTRACT

Embodiments of the present invention provide for enhanced monitoring of optical signal characteristics of an optical signal propagating in a signal channel of a photonic integrated circuit. The optical signal characteristics can be obtained with minimal signal loss in the optical signal path and reduced RF crosstalk, while the electrostatic discharge threshold for the photonic integrated circuit is increased, due to the inclusion of a second electro-optic element electrically coupled to a first electro-optic element as part of the signal channel.

32 Claims, 6 Drawing Sheets

PHOTONIC INTEGRATED CIRCUIT WITH IMPROVED SIGNAL QUALITY AND ELECTROSTATIC DISCHARGE THRESHOLD

BACKGROUND OF THE INVENTION

1. Field of the Invention

This invention relates to photonic integrated circuits, and more particularly to arrays of signal channels, each signal channel including a plurality of electro-optic elements for producing optical signals for transmission at high rates across a digital optical network infrastructure.

2. Description of the Related Art

Optical transmission networks are deployed for transporting data in long haul networks, metropolitan area networks, and other optical communication applications. More recently, advanced photonic integrated circuits have been designed and utilized to provide the necessary electrical-to-optical conversion necessary to realize such optical networks. In the simplest form, such photonic integrated circuits typically comprise one or more electro-optical elements in a signal channel which cooperate to provide a modulated optical output signal corresponding to an electrical data signal received for transmission across the optical network infrastructure. Such electro-optical elements may include, for example, laser sources, modulators, modulated laser sources, amplifiers and attenuators, among other elements. Exemplary photonic integrated circuits used as part of the transmitters and receivers of a digital optical transmission network can be found in U.S. Pat. No. 7,283,694, entitled "TRANSMITTER PHOTONIC INTEGRATED CIRCUITS (TXPIC) AND OPTICAL TRANSPORT NETWORKS EMPLOYING TXPICS," and U.S. Pat. No. 7,116,851, entitled "AN OPTICAL SIGNAL RECEIVER, AN ASSOCIATED PHOTONIC INTEGRATED CIRCUIT (RxPIC), AND METHOD IMPROVING PERFORMANCE," both of which are incorporated herein in their entirety by reference.

A digital optical transmission network is limited in performance due to several issues, including the optical signal-to-noise ratio and the signal quality or Q at both the optical transmitter and receiver. The Q of the optical receiver, that is the level of distortion in the optical signal which the optical receive can tolerate, is affected by factors, such as, for example, the power variations in the optical transmitter, wavelength dependent losses, and insertion losses in the transmitter and receiver. Moreover, improper handling of the circuits or systems related to the digital optical transmission network can result in further defects related to electrostatic discharge, and such defects further reduce the operating range of the corresponding electro-optic elements making up such circuits or systems. The accumulative effect of the foregoing is to limit the overall reach of the optical transmission system or, alternatively, to increase the cost of the system.

It is often desirable to place one or more light-absorbing electro-optic elements within the signal channel of the transmitter or receiver, for example to provide power monitoring or power equalization, or both. For power monitoring, such light-absorbing electro-optic elements can directly acquire data related to one or more of the above performance issues from light propagating along the optical path of the signal channel, and enhance the ability of the transmitter photonic integrated circuit to achieve higher levels of performance. Typically, for illustration purposes only, in the acquisition of information, the optical signal along the path of the signal channel in the transmitter is sensed and converted into a measurable quantity representative of the acquired information, for example a characteristic of the optical signal related to the aforementioned performance issues. For power equalization, such light-absorbing elements can be biased to absorb a known amount of optical power, thus reducing the amount of light which propagates along the remainder of optical path of the signal channel. In addition to the power monitoring described above, the light-absorbing element can be further biased to absorb more or less optical power, as desired, to provide a desired output power for that particular signal channel.

With the addition of such light-absorbing electro-optic elements, however, comes additional drawbacks. One drawback is the optical power loss, or insertion loss, associated with such electro-optic elements positioned along the optical path of the signal channel. As stated immediately above, information regarding the optical signal can be obtained, but in doing so, some amount of the optical signal is typically absorbed, or otherwise lost. Compensation for such loss can be achieved through further amplification, however such compensation comes with higher power requirements, eventually realized in increasing operating costs. Additionally, at high data rates, the portion of the optical signal which is absorbed by such light-absorbing electro-optic elements positioned within a signal channel results in a corresponding high speed pulsing photocurrent which then acts to further bias the element. Such self-biasing detrimentally affects the signal quality or Q of the optical signal propagating down the signal channel.

Another drawback is the radio frequency (RF) interference associated with such light-absorbing electro-optic elements. For example, with respect to monitoring elements, as the optical signal is converted into a measurable quantity, an electrical signal having oscillatory characteristics similar to the optical signal itself may be generated. Such oscillating electrical signals can be electrically coupled to other electro-optic elements in that signal channel, or another signal channel in close proximity, resulting in noise or undesirable crosstalk and, ultimately, optical signal degradation. The self-biasing affects due to high speed optical signals traveling through light-absorbing electro-optic elements may also lead to undesirable crosstalk and contribute to such signal degradation.

Still another drawback of having light-absorbing electro-optic elements positioned within a signal channel is electrostatic discharge susceptibility. For example, electrical signals correspond to one or more characteristics related to the optical signal propagating in a signal channel, or which are provided to allow for power manipulation in an optical signal, typically must be processed. Such processing of the electrical signals may be performed in a circuit spaced from the photonic integrated circuit itself. With an increase in the number of such electro-optic elements present in the signal channel, therefore, can often result in higher pin counts at the point where the photonic integrated circuit interfaces with additional external circuitry, for example circuitry which will process the electrical signals from the light-absorbing electro-optic devices. Improper handling of such devices, during manufacture or repair for example, can result in failure or impairment of the associated electro-optic devices resulting in inoperative transmission systems along the signal channel, impaired signal quality, or impaired overall performance.

What is needed is a photonic integrated circuit which includes one or more light-absorbing electro-optic elements and supporting circuitry configured to obtain or manipulate a characteristic related to the optical signal propagating along a signal channel while reducing performance losses associated with such light absorbing devices. Furthermore, what is needed is a photonic integrated circuit which allows for smaller sized performance monitoring electro-optic elements resulting in lower optical signal power loss, and reducing the operating costs of such systems employing such photonic integrated circuits. Further, a photonic integrated circuit is needed which minimizes the RF crosstalk related to the addition of certain performance monitoring electro-optic elements. In addition, a photonic integrated circuit is needed which includes performance monitoring electro-optic elements having a decreased susceptibility to electrostatic discharge.

SUMMARY OF THE INVENTION

According to this disclosure, embodiments of the present invention include electro-optic elements which cooperate with additional electro-optic elements located within a signal channel to improve overall performance of the associated photonic integrated circuit. The photonic integrated circuit can be a whole, or a part of, a transmitter or receiver photonic integrated circuit. The signal channel of the photonic integrated circuit includes a first electro-optic element provided on a substrate which provides an optical signal, and a second electro-optic element provided on the substrate which receives the optical signal, and a circuit element which is electrically coupled to, and cooperates with, the second electro-optic element to improve the overall performance of the photonic integrated circuit. In some embodiments, the second electro-optic element is a performance monitoring electro-optic element, while in other embodiments the second electro-optic element maintains a desired optical signal power.

In other embodiments of the present invention, the circuit element cooperates with the second electro-optic element to provide a desired electrical capacitance while maintaining desired optical characteristics of the second electro-optic element. In some embodiments the circuit element is simply a capacitor provided adjacent to, or on, the substrate. In still other embodiments the circuit element is a third electro-optic element, the first, second, and third electro-optic elements comprising one or more of a laser, a modulator, a modulated laser source, an attenuator, an amplifier, and a photodetector.

In still further embodiments of the present invention, the signal channel of the photonic integrated circuit is a corresponding one of a plurality of signal channels, each of the signal channels providing a modulated optical output to a multiplexer which combines the modulated signals into a wavelength division multiplexed (WDM) signal provided as an output from the multiplexer.

Other objects and attainments together with a fuller understanding of the invention will become apparent and appreciated by referring to the following description and claims taken in conjunction with the accompanying drawings.

DETAILED DESCRIPTION OF THE INVENTION

While the discussion below is specifically directed to embodiments utilized in transmitter photonic integrated circuits, it should be apparent to one of ordinary skill in the art that such embodiments can be utilized in other devices as part of a digital optical network infrastructure, such as in a receiver photonic integrated circuit.

Figure 1:
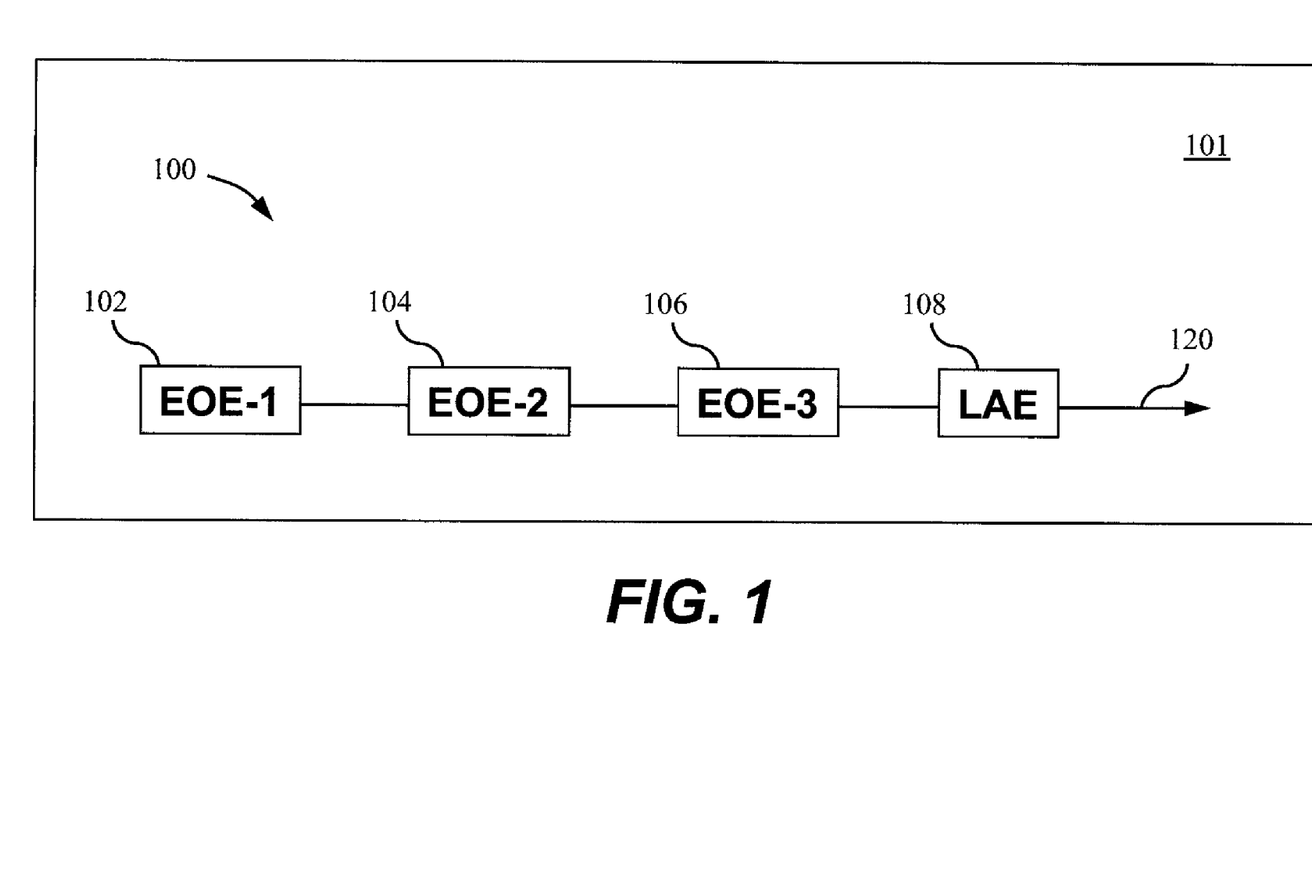
FIG. 1 is a planar depiction of a signal channel of a photonic integrated circuit utilized in association with certain aspects of the present invention.

Reference is now made to FIG. 1 which illustrates, in block diagram, an optical signal channel 100 utilized in association with certain aspects of the present invention. Signal Channel 100, provided on a substrate 101, may include a number of electro-optic elements, one of which is a light-absorbing element configured to monitor, or otherwise modify, the optical signal travelling along the optical path of optical signal channel 100. More specifically, signal channel 100 comprises a first 102, a second 104, and a third 106 electro-optic element (EOE) designated as EOE-1, EOE-2, and EOE-3, respectively, and a light-absorbing electro-optic element (LAE) 108. While the electro-optic elements of channel 100 may be discrete devices, preferably they are provided on a single substrate of a monolithic photonic integrated circuit, such as those cited in U.S. Pat. Nos. 7,283,694 and 7,116,851, supra. The electro-optic elements 102, 104, 106, including the LAE 108, can be any suitable electro-optic element which creates, modifies, or interprets a characteristic of the optical energy propagating through the signal path 100, consistent with this disclosure. Such suitable electro-optic elements include, but are not limited to, a laser source, such as an DFB or DBR laser source, a modulator, such as an electro-absorption modulator or a Mach-Zehnder modulator, a modulated laser source, an attenuator, such as a variable optical attenuator, or a PIN or avalanche photodiode, an amplifier such as a semiconductor optical amplifier, or a photodetector such as a PIN or avalanche photodiode.

As one of ordinary skill in the art will readily understand, the depicted arrangement of electro-optic elements 102, 104, 106, and 108 in FIG. 1 is one of a plurality of suitable arrangements and the present invention is not limited to any one such arrangement. For illustrative purposes only, electro-optic element 108, therefore, can be positioned within the optical path of signal channel 100 between elements 104 and 106, to receive the optical signal from element 104 and pass on at least a portion of the optical signal to element 106. Furthermore, while depicted to include four electro-optic elements, 102, 104, 106, 108, as should be apparent to one of ordinary skill in the art, signal channel 100 can include more or less electro-optic elements than what is depicted in FIG. 1.

In operation, optical energy is typically generated in one of the electro-optic elements and then provided to one or more of the remaining electro-optic elements in the signal channel, which then act on the optical energy, ultimately providing an output signal 120 for further processing. For example, electro-optic element EOE-1 of FIG. 1 may be a laser source configured to generate an optical signal having a corresponding one of a plurality of known wavelengths. The generated optical signal may then be passed to the second element EOE-2, a modulator 104 for example, which then provides a modulated output signal to the third element EOE-3, an amplifier 106 for example. Amplifier 106 then provides an amplified modulated optical signal to the LAE 108 which then absorbs a portion of the optical energy to measure a characteristic of the optical signal, or modify the optical power of the optical signal, propagating through signal channel 100. For example, the LAE 108 may be monitoring the power of the optical signal propagating in the signal channel 100, and amplifier 106, cooperating with LAE 108, amplifies the optical signal to provide an output signal 120 having a desired output power level. LAE 108 may be an attenuator, such as a variable optical attenuator, which absorbs varying levels of optical energy from the optical signal propagating signal channel 100 to manipulate the optical power of the signal in signal channel 100 and, ultimately, the power of output signal 120.

Typically, light-absorbing element 108 is a variable optical attenuator or photodetector appropriately biased for the function which it will perform. For example, the LAE 108 may have a negative or reverse junction bias to bring about the desired optical absorption and, ultimately, the desired attenuation of an optical signal propagating through signal channel 100. Alternatively, LAE 108 may be utilized to monitor one or more characteristics of an optical signal propagating in signal channel 100, such characteristics including, but not limited to, laser source output power, laser source operating wavelengths for purposes of wavelength stabilization, output intensity or power of a modulated optical signal, as well as chirp and the extinction ratio of the modulator, under various operating conditions. For photodetectors in power monitoring applications, the photodetectors need not to be operated as a reversed biased device, but can be slightly positive biased to minimize insertion loss related to the monitoring photodetector and render the photodetector more transparent to the light originating from the laser source electro-optic element. Whether utilized in monitoring applications or as attenuators, an LAE 108 in the form of a photodetector may be either an avalanche diode, or preferably a PIN diode, both of which are well known in the art.

The position of such LAE 108 devices within the optical path of signal channel 100 can have detrimental affects on the optical signal propagating therethrough, for example when the LAE 108 is positioned to receive a modulated optical signal propagating in signal channel 100. In such cases, the signal quality or Q can be adversely impacted resulting in signal degradation. For example, when the reverse bias of the LAE 108 is varied to control the optical signal absorption and, ultimately, optical power of the optical signal propagating signal channel 100, the waveform created by the electro-optic modulator preceding LAE 108, e.g. electro-optic element 106, can be altered by a charge transport phenomena, or "self-biasing", occurring at the LAE 108, as is discussed in greater detail below. This phenomena can affect the fidelity of the transmitted waveform, inducing changes in the bit error rate perceived by an optical receiver.

In order to improve the performance and efficiency of such photonic integrated circuits as depicted in FIG. 1, the impact of the light-absorbing element 108 on the optical signal propagating through the corresponding signal channel 100 must be reduced. The various devices or elements utilized as light-absorbing elements absorb optical energy for the performance of various functions, such as for example power normalization or monitoring of the optical signal, but at the cost of optical loss. In order to reduce such optical loss the light-absorbing elements are preferably reduced in size, having a length in the range of about 5 μm to about 10 μm for example. Such small lengths, however, may lead to increased RF crosstalk and a higher likelihood of damage due to ESD, as discussed above.

Figure 2:
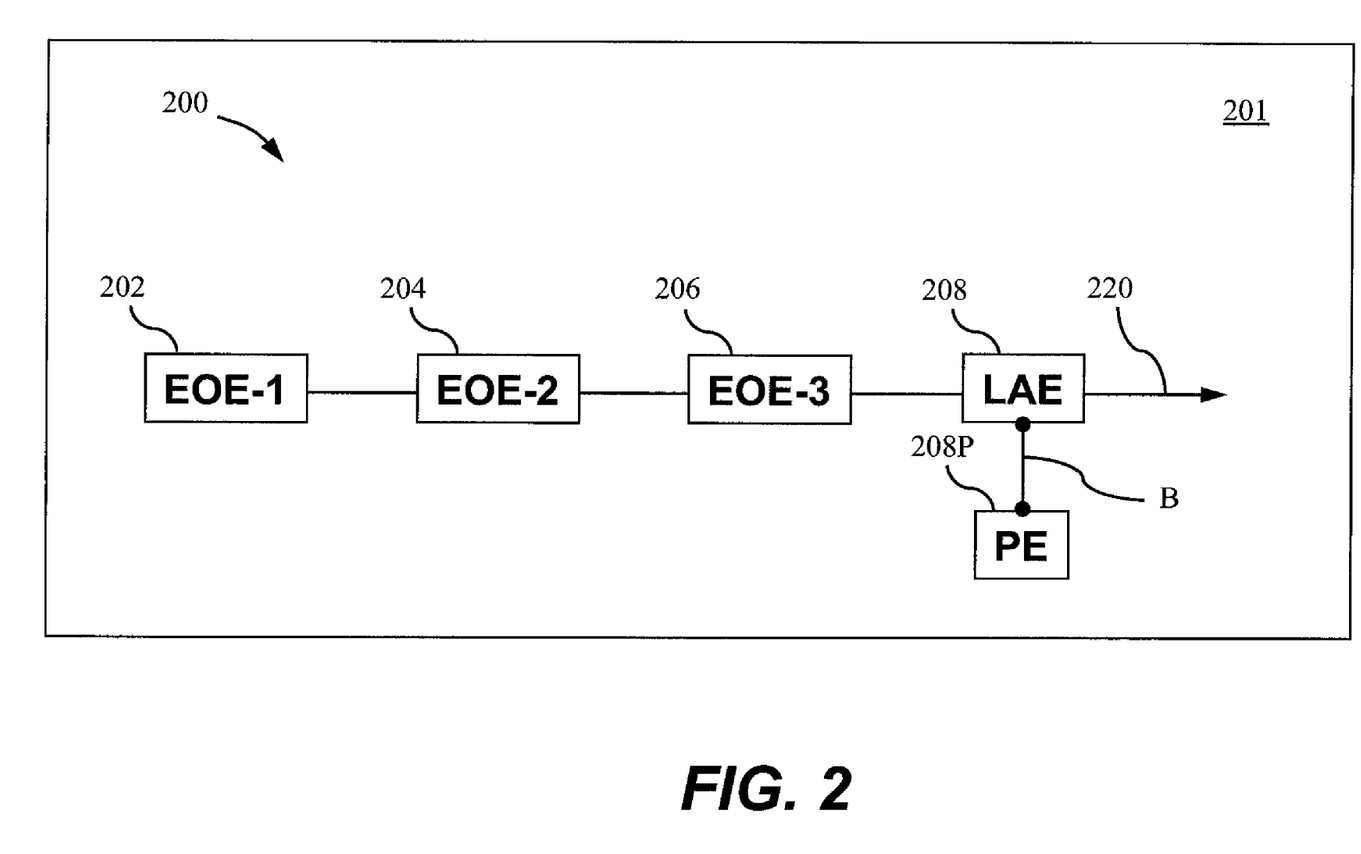
FIG. 2 is a planar depiction of a signal channel of a photonic integrated circuit in accordance with various aspects of the present invention.

Now turning to FIG. 2, an exemplary signal channel of a photonic integrated circuit in accordance with various aspects of the present invention will be discussed in greater detail. Signal channel 200 is similar to signal channel 100, the various electro-optic elements of signal channel 200 arranged in a similar manner to signal channel 100, for example provided on a substrate 201. More specifically, signal channel 200 comprises a first 202, a second 204, and a third 206 electro-optic element, designated as EOE 1, EOE 2, and EOE 3, respectively. Signal channel 200 further comprises a light-absorbing element 208, designated as LAE. As with signal channel 100 above, optical energy is produced and manipulated by the first 202, second 204, and third 206 electro-optic elements prior to reaching the LAE 208. The LAE 208 absorbs a portion of the optical energy and passes the remaining optical energy as an output signal 220.

Signal channel 200 further comprises an electro-optic element 208P, designated PE, electrically coupled to LAE 208 through an electrical bond B, such as via a metal trace between the electro-optic elements LAE 208 and PE 208P, or other suitable bond consistent with this disclosure. For ease of fabrication, the electro-optic element 208P may share the active region with the LAE 208. However, the active region of the electro-optic element 208P is parallel to, and out of, the optical path of signal channel 200. The photonic integrated circuit comprising signal channel 100, or other embodiments described herein, can be fabricated in any suitable manner know in the art and consistent with the discussion herein. Such fabrication details, for example, can be found in U.S. Pat. Nos. 7,283,694 and 7,116,881, supra., as well as in U.S. Pat. No. 7,162,113, entitled "DEPLOYMENT OF ELECTRO-OPTIC AMPLITUDE VARYING ELEMENTS (AVEs) AND ELECTRO-OPTIC MULTI-FUNCTIONAL ELEMENTS (MFEs) IN PHOTONIC INTEGRATED CIRCUITS (PICs)," which is incorporated herein in its entirety by reference.

As mentioned above, the relatively short length of LAE 208, compared to the remaining electro-optic elements in signal channel 200, results in fast operation, because, for example, the element LAE 208 may have a small parasitic capacitance, in the range of from about 30 fF to about 90 pF. However, as an optical signal passes through LAE 208, in this case a modulated output signal, the high speed digital pulses of the modulated optical signal propagating through the LAE 208 results in a corresponding high speed pulsing photocurrent which further acts to bias the LAE 208. Since the equivalent circuit of the LAE 208 includes a resistance, this high speed photocurrent results in a corresponding high speed pulsing voltage drop across the resistance, for example at the bias input of the LAE 208 where the bond B interfaces with the LAE 208. This pulsing self-bias voltage is then converted to a level of light absorption which, in turn, then affects the signal quality or Q. With PE 208P electrically coupled to LAE 208, however, an additional capacitance is coupled to LAE 208 to reduce or slow down the self-biasing action of the LAE 208, without impacting the absorption properties of the LAE 208 itself. Although described as being provided on the substrate 201, one of ordinary skill in the art will understand that PE 208P may be a capacitor located spaced apart from the substrate 201. While PE 208P can be any suitable element which provides the requisite capacitance, preferably, PE 208P is an electro-optic element as described above, and more preferably, PE 208P is a PIN photodetector. PE 208P may have any suitable capacitance to overcome the problems discussed herein, and more preferably, capacitance in the range of about 65 pf to about 100 pf.

Figure 3:
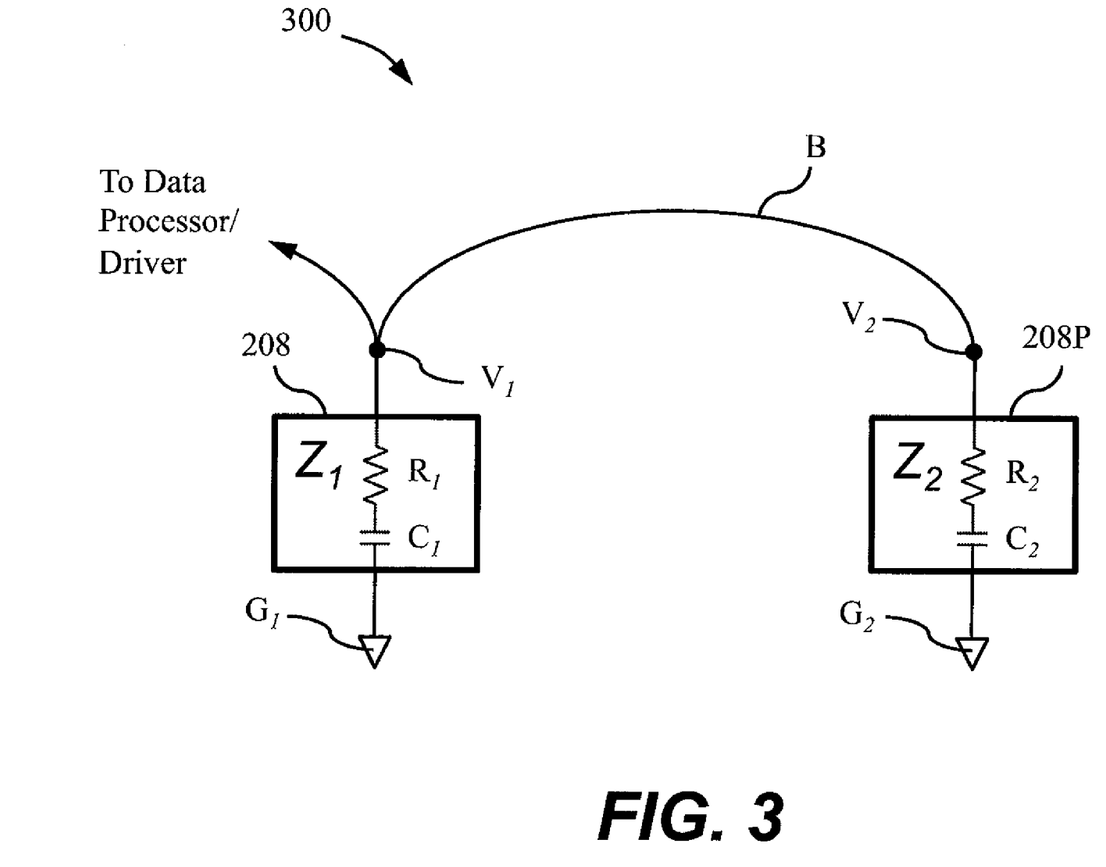
FIG. 3 is a generalized schematic diagram of two electro-optic elements, in accordance with various aspects of the present invention.

FIG. 3 illustrates an equivalent circuit diagram of the coupling between LAE 208 and PE 208P. For clarity, the remaining electro-optic elements 202, 204, 206 of signal channel 200, as well as the substrate 201, are not shown in FIG. 3. In circuit 300, LAE 208 and electro-optic element PE 208P are electrically connected in parallel. LAE 208 can be modeled as an equivalent circuit $Z_1$, for example comprising a small parasitic capacitance, $C_1$, due to its short length, as well as a resistance, $R_1$, in series with the capacitance. A bias voltage is developed across LAE 208, the bias voltage potential being equal to the voltage difference between the potential at $V_1$ and a substrate potential at $G_1$, as depicted. In similar fashion, PE 208P comprises an equivalent circuit $Z_2$, including a capacitance $C_2$ in series with a resistance $R_2$, and has a bias voltage being equal to the voltage difference between the potential at $V_2$ and a substrate potential at $G_2$. The LAE 208 and PE 208P are electrically bonded through bonding joint B, such as an electrical trace provided during fabrication for example. As will become apparent with the further discussion below, the distance of LAE 208 and PE 208P should be minimized such that inductive affects of the bonding joint B, as well as its resistance, are minimal and, accordingly, the potential at $V_1$ is substantially equal to the potential at $V_2$.

Depending on the specific functionality of LAE 208, the bias of LAE 208 is set by a data processor/driver circuit via an electrical connection from such data processor/driver circuit to LAE 208, as generally indicated by arrow A. Regardless of the functionally, as stated above, without the PE 208 present, LAE 208 reacts to the optical energy passing therethrough and, in response to the optical energy, results in a correspondingly high speed oscillating photocurrent which then self-biases the LAE 208. However, PE 208 is selected, or otherwise fabricated or manufactured, to comprise a higher capacitance $C_2$ than capacitance $C_1$ of equivalent circuit $Z_1$. Accordingly, the overall equivalent capacitance of the electrical circuit comprising LAE 208 and PE 208 is significantly higher than that of LAE 208 alone. The higher capacitance effectively slows down the reaction of LAE 208 to the high speed pulsating or oscillating optical signal and, therefore, substantially reduces the resulting pulsating or oscillating high speed photocurrent, while the optical properties, such as absorption as a function of voltage, remain completely intact.

As mentioned above, photonic integrated circuits, such as circuit 300 as part of circuit 200, are generally susceptible to damage as a result of electrostatic discharge. This susceptibility scales inversely with the length of the electro-optic elements, where elements having shorter lengths are more susceptible than those elements having longer lengths. With the inclusion of PE 208 in the photonic integrated circuit 300, an additional parallel electrical path becomes available to dissipate such undesirable electrostatic energy, thus reducing the risk of partial or full failure of the light-absorbing element 208. Use of the PE 208 in this manner has resulted in an increased ESD threshold, from about 250 V for an LAE having a length of about 50 μm and the PE 208 not present in the circuit 300, to about 500 V, for an LAE having a length of about 25 μm and the PE 208 present in the circuit 300. Such data is exemplary and provided not to indicate extremes of achievable ESD thresholds, but rather that the ESD threshold itself is improved through application of a parallel electro-optic element, such as PE 208P.

As should be readily apparent to one skilled in the art, additional parallel electro-optic elements may be provided in addition to PE 208 in order to achieve the desired overall capacitance to enhance performance of the LAE 208 and, ultimately, signal channel 200 as part of a photonic integrated circuit. Furthermore, additional electro-optic elements similar to PE 208 may be positioned parallel to one or more other electro-optic elements EOE 1-1, 1-2, 1-3 within signal channel 200 to provide the enhancements and benefits discussed herein.

Figure 4:
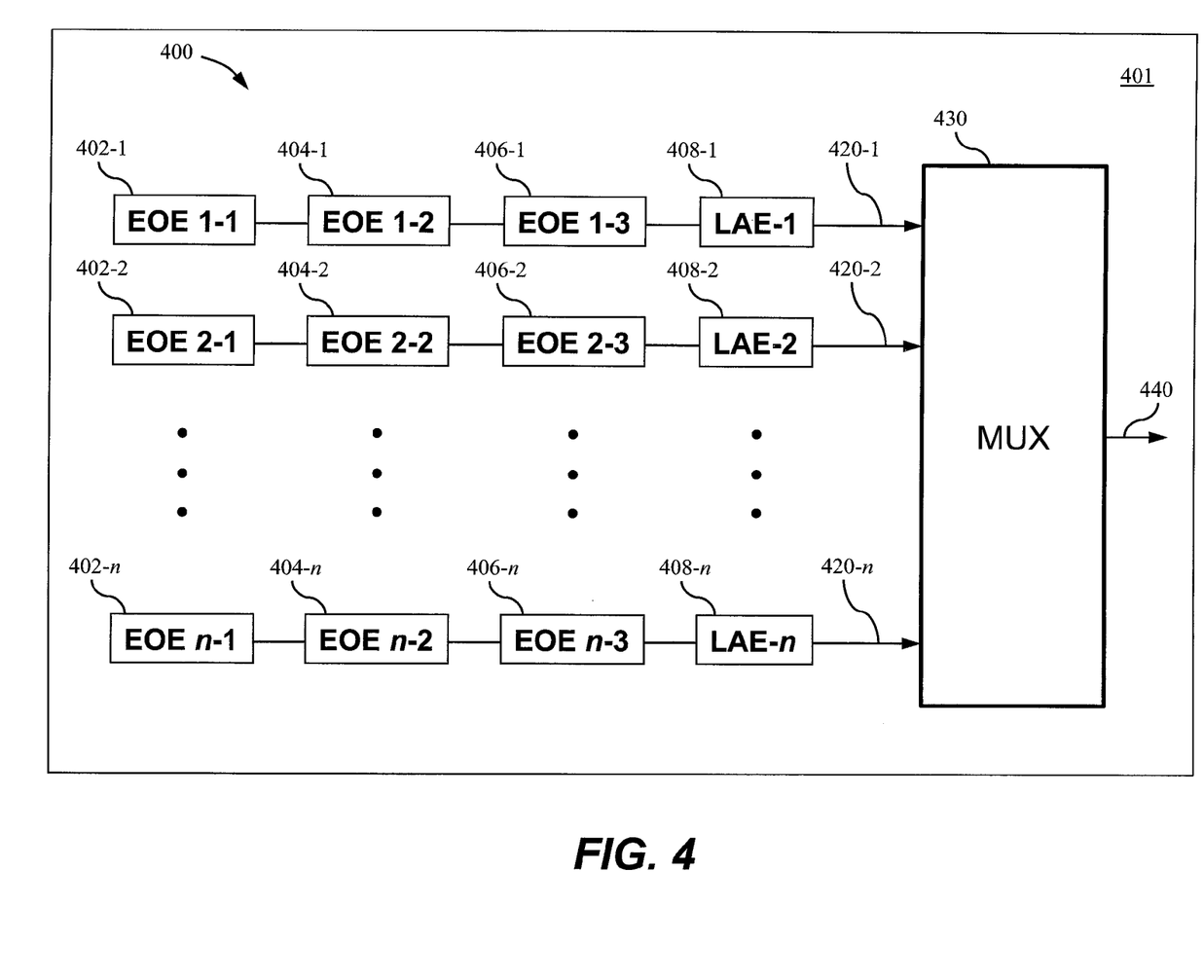
FIG. 4 is a planar depiction of multiple signal channels of a photonic integrated circuit utilized in association with certain aspects of the present invention.

Reference is now made to FIG. 4 which illustrates, in block diagram, a plurality of n optical signal channels 400, e.g. signal channels 400-1 through 400-n, provided on a substrate 401, each comprising one or more electro-optic elements, one of which is a light-absorbing element, for example configured to monitor the optical signal propagating along the path of one of the optical signal channels 400. More specifically, each of the signal channels 400 may comprise a first 402, a second 404, and a third 406 electro-optic element, designated as EOE 1, EOE 2, and EOE 3, respectively, and a monitoring electro-optic element 408, designated LAE. The electro-optic elements of signal channels 400 are similar to those in signal channel 100 of FIG. 1, discussed in greater detail above, and operation of each of the signal channels 400 operates in a manner similar to signal channel 100 of FIG. 1. Additionally, each signal channel 400 of the FIG. 4 embodiment provides an optical output 420 which is provided to a multiplexer 430, the multiplexer 430 combining the optical output signals 420-n into a wavelength division multiplexed (WDM) signal provided as an output 440 of multiplexer 430. As with the signal channel 100 of FIG. 1, each of the signal channels 400 may have more or less electro-optic elements, and such electro-optic elements may be arranged in any suitable manner along the path of the optical signal channel 400-n, for example similar to, or different from, arrangements used in adjacent signal channels 400.

Figure 5:
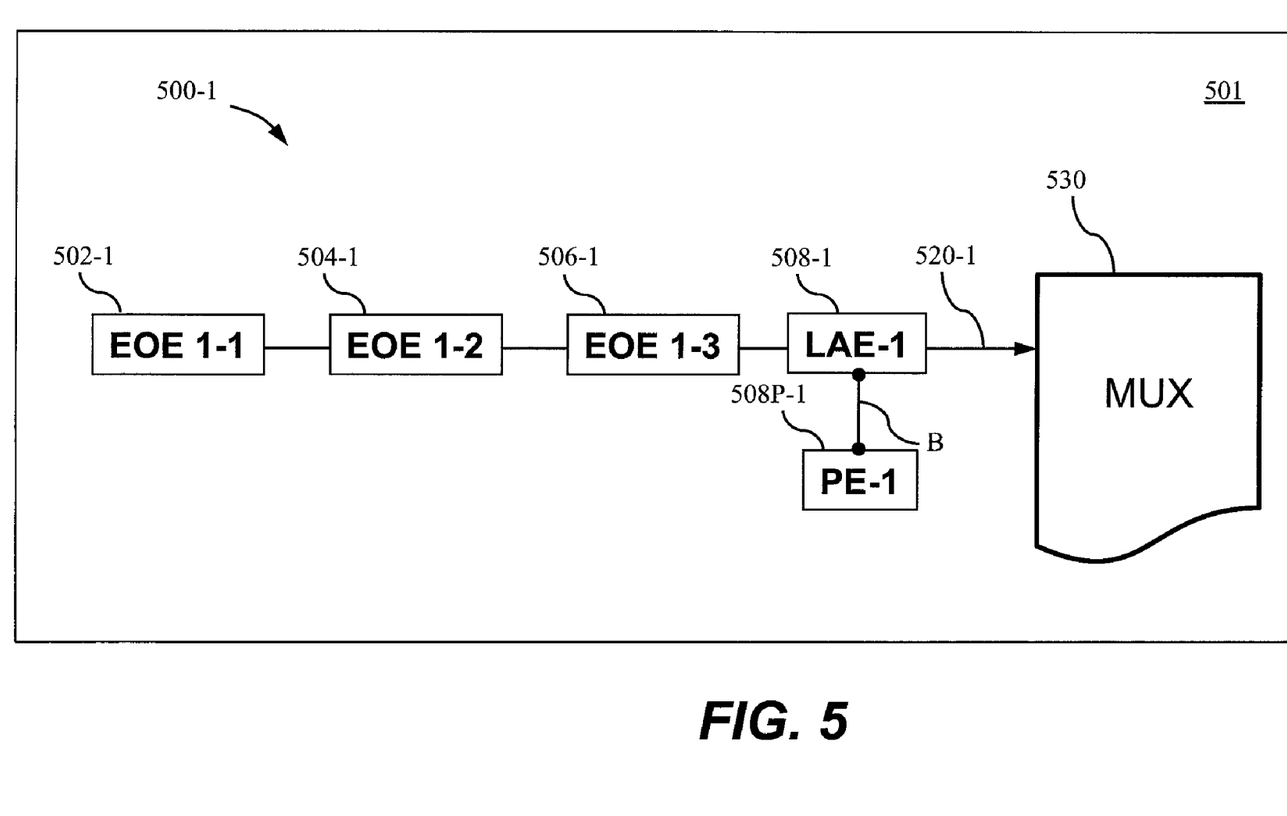
FIG. 5 is a planar depiction of one of a plurality of signal channels of a photonic integrated circuit in accordance with various aspects of the present invention.

Reference is also made to FIG. 5 which depicts one signal channel 500-1, similar to signal channel 400-1 of FIG. 4, of a plurality of signal channels 500 provided on a substrate 501, however signal channel 500-1 including a parallel electro-optic element. Individual signal channel 500-1 is similar to signal channel 400-1 described above, the signal channel 500-1 for example comprising multiple electro-optic elements 502-1, 504-1, and 506-1, designated as EOE 1-1, EOE 1-2, and EOE 1-3, respectively. Furthermore, signal channel 500-1 includes a light-absorbing electro-optic element 508-1, designated as LAE-1. LAE-1 508-1 is similar to LAE 208 of signal channel 200. Unlike signal channel 400-1 however, signal channel 500-1 further comprises a parallel electro-optic element PE 508P-1 electrically coupled to the LAE-1 508-1. As noted with other signal channels discussed herein, the number and relative position of each of the electro-optic elements, including the parallel electro-optic element, is depicted for illustration purposes only. Accordingly, signal channel 500-1 may contain more or less electro-optic elements than what is depicted in FIG. 5. Additionally, as discussed with regard to signal channel 200 of FIG. 2, additional parallel electro-optic elements may be electrically coupled to the LAE-1 508-1, or one or more additional parallel electro-optic elements may be electrically coupled to corresponding one or more remaining electro-optic elements EOE 1-1, 1-2, 1-3 of signal channel 500-1. Last, one or more remaining signal channels of channels 500 may each include one or more parallel electro-optic elements electrically coupled to one or more electro-optic elements of that signal channel.

Figure 6:
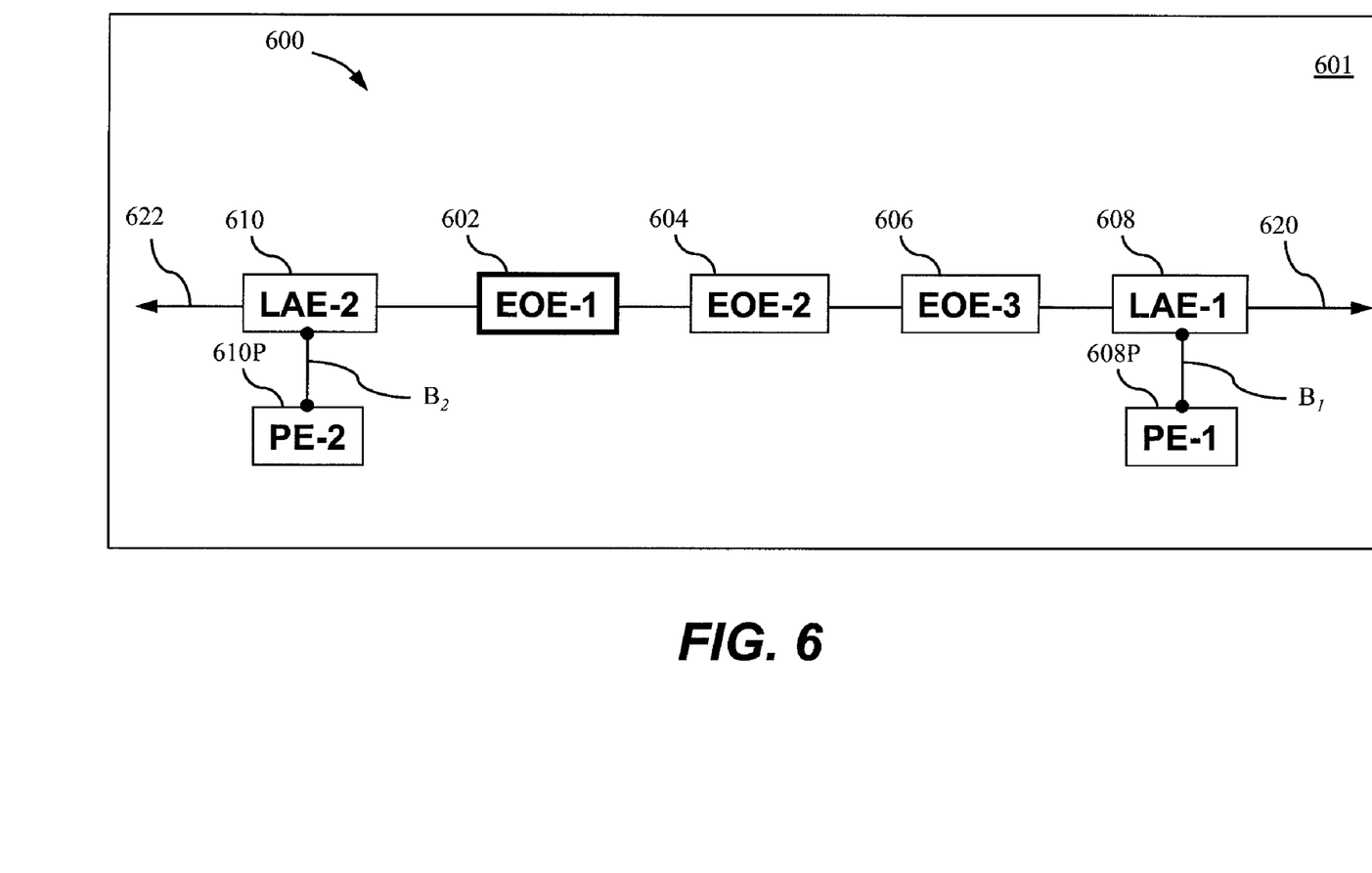
FIG. 6 is a planar depiction of an exemplary signal channel of a photonic integrated circuit utilized in association with the present invention.

Turning to FIG. 6, another embodiment of the present invention will be discussed in greater detail. FIG. 6 generally depicts a signal channel which comprises multiple light-absorbing elements, each light-absorbing element coupled to a corresponding parallel electro-optic element, in accordance with the present invention. As depicted, a signal channel 600 provided on a substrate 601 comprises a first 602, a second 604 and a third 606 electro-optic element, designated as EOE- 1, EOE-2, and EOE-3, respectively. For purposes of discussion here, first, second, and third electro-optic elements 602, 604, 606 are similar to electro-optic elements 202, 204, 206 of the FIG. 2 embodiment. Electro-optic element 602 is a laser source which provides an optical signal in a first direction propagating towards a first light-absorbing electro-optic element LAE-1 608, and in a second direction propagating towards a second light-absorbing electro-optic element LAE-2 610, each of the LAE-1 608 and LAE-2 610 providing a corresponding optical output 620 and 622, respectively. It should be noted that LAE-2 may by utilized only for monitoring purposes and, as such, effectively terminates the optical signal which originates from EOE-1, preventing undesirable reflections from the nearest facet, for example, from entering laser source EOE-1 and causing instabilities in the emission wavelength of the optical signal. Accordingly, no output signal 622 would be provided by element LAE-2 610. For example, LAE-2 may be used to detect a small portion of the optical signal propagating form EOE-1, e.g. emitting out a second end of a laser source, for measuring power intensity for the purposes of, for example, calibrating the laser source.

As shown, signal channel 600 further comprises a first parallel electro-optic element 608P, designated PE-1, and a second parallel electro-optic element designated PE-2, PE-1 electrically bonded to LAE-1 via bond $B_1$, while PE-2 is electrically bonded to LAE-2 via a bond $B_2$. Each of the parallel electro-optic elements PE-1, PE-2 are similar to element PE 208 of FIG. 2, providing the performance enhancements to the optical signal propagating in the signal channel 600, whether in the first direction toward LAE-1 or in the second direction toward LAE-2, as discussed herein. Furthermore, as should be apparent in light of the discussion herein, signal channel 600 can be one of a plurality of n signal channels, each providing a corresponding output signal which are multiplexed into a WDM output signal for transmission across a digital optical network infrastructure, as described with respect to FIGS. 4 and 5 for example. LAEs 608, 610, as with other LAE devices discussed herein, may be operated on a periodic basis to lower associated insertion losses further improving overall performance of the corresponding signal channel.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A photonic integrated circuit, comprising:
a substrate;
a first electro-optic element provided on the substrate, the first electro-optic element providing an optical signal;
a second electro-optic element provided on the substrate, the second electro-optic element having a first capacitance and configured to receive the optical signal; and
a circuit element having a second capacitance, the circuit element being electrically connected in parallel to the second electro-optic element, such that the second electro-optic element and the circuit element constitute a circuit that has a third capacitance, the third capacitance being greater than the first capacitance.

2. The photonic integrated circuit of claim 1, wherein the first electro-optic element comprises a modulated laser source, the optical signal being a modulated optical signal.

3. The photonic integrated circuit of claim 2, wherein the modulated laser source comprises a laser source optically coupled to a modulator.

4. The photonic integrated circuit of claim 3, wherein the laser source is a DFB laser or a DBR laser.

5. The photonic integrated circuit of claim 3, wherein the modulator is an electro-absorption modulator.

6. The photonic integrated circuit of claim 1, wherein the second electro-optic element is configured to determine a characteristic of the optical signal.

7. The photonic integrated circuit of claim 6, wherein the characteristic is proportional to an optical power value of the optical signal.

8. The photonic integrated circuit of claim 6, wherein the characteristic is proportional to the respective one of the plurality of emission wavelengths.

9. The photonic integrated circuit of claim 6, wherein the second electro-optic element is a PIN photodiode.

10. The photonic integrated circuit of claim 9, wherein the characteristic is represented by a voltage value at an electrode of the PIN photodiode.

11. The photonic integrated circuit of claim 6, wherein the second electro-optic element is a variable optical attenuator.

12. The photonic integrated circuit of claim 6, wherein the second electro-optic element is a semiconductor optical amplifier.

13. The photonic integrated circuit of claim 1, wherein the first electro-optic element is a corresponding one of a plurality of first electro-optic elements.

14. The photonic integrated circuit of claim 13, wherein each of the plurality of first electro-optic elements is one of a laser source, a modulator, a modulated laser source, a photodetector, a variable optical attenuator, or a semiconductor optical amplifier.

15. The photonic integrated circuit of claim 14, wherein the photodetector is a PIN photodiode or an avalanche photodiode.

16. The photonic integrated circuit of claim 1, wherein the capacitance of the first capacitance is in the range of about 30 fF to about 90 pF.

17. The photonic integrated circuit of claim 1, wherein the capacitance of the second capacitance is in the range of about 65 pF to about 100 pF.

18. The photonic integrated circuit of claim 1, wherein the remaining portion of the optical output signal which passes through the second electro-optic element is provided as an optical output signal of the photonic integrated circuit.

19. The photonic integrated circuit of claim 1, wherein the circuit element is a capacitor.

20. The photonic integrated circuit of claim 1, wherein the circuit element is provided on the substrate.

21. The photonic integrated circuit of claim 20, wherein the circuit element is a capacitor.

22. The photonic integrated circuit of claim 1, wherein the circuit element is a third electro-optic element.

23. The photonic integrated circuit of claim 22, wherein the third electro-optic element is a PIN photodetector.

24. The photonic integrated circuit of claim 22, wherein the first electro-optic element and the third electro-optic element share a common active region.

25. The photonic integrated circuit of claim 19, wherein the active region of the third electro-optic element is not positioned along the optical path.

26. The photonic integrated circuit of claim 1, wherein the circuit is a first circuit and the element is a first of a plurality of circuit elements, each of the plurality of circuit elements being electrically connected to remaining ones of the plurality of circuit elements to constitute a second circuit that has a fourth capacitance, the second circuit connected in parallel to the second electro-optic element, such that the second electro-optic element and the second circuit constitute a third circuit that has a fifth capacitance, the fifth capacitance being greater than the first capacitance.

27. The photonic integrated circuit of claim 26, wherein one of the plurality of circuit elements is a capacitor.

28. The photonic integrated circuit of claim 26, wherein one of the plurality of circuit elements is a third electro-optic element.

29. The photonic integrated circuit of claim 28, wherein the third electro-optic element is provided on the substrate.

30. The photonic integrated circuit of claim 1, wherein the optical signal is a first optical signal, the circuit element is a first circuit element, and the first electro-optic element also providing a second optical signal, the photonic integrated circuit further comprising:

a fourth electro-optic element provided on the substrate, the fourth electro-optic element having a fourth capacitance and configured to receive the second optical signal; and a second circuit element having a fifth capacitance, the second circuit element being electrically connected in parallel to the fourth electro-optic element, such that the fourth electro-optic element and the second circuit element constitute a second circuit that has a sixth capacitance, the sixth capacitance being greater than the first capacitance.

31. The photonic integrated circuit of claim 30, wherein the first circuit element is a third electro-optic element and the second circuit element is a fifth electro-optic element.

32. The photonic integrated circuit of claim 31, wherein the third and fifth electro-optic elements are PIN photodetectors.

* * * * *